United States Patent [19]
McCloud et al.

[11] 3,935,891
[45] Feb. 3, 1976

[54] TIRE TRACTION DEVICE

[75] Inventors: Marvin H. McCloud, Tucson, Ariz.;
Delores J. McCloud, Stevensville, Mont.

[73] Assignee: Marvin H. McCloud, Sr., Tucson, Ariz.

[22] Filed: Dec. 18, 1974

[21] Appl. No.: 533,850

[52] U.S. Cl. ............................ 152/225 R; 152/220
[51] Int. Cl.² ........................................ B60C 27/07
[58] Field of Search ............ 152/170, 171, 172, 185, 152/186, 213 R, 213 A, 217–220, 225–241

[56] References Cited
UNITED STATES PATENTS

| | | |
|---|---|---|
| 1,599,001 | 9/1926 | Anderson et al. ............... 152/217 X |
| 2,397,277 | 3/1946 | Lawrence ............................ 152/218 |
| 2,473,782 | 6/1949 | Boone ................................. 152/220 |
| 2,557,241 | 6/1951 | Silver .................................. 152/220 |
| 2,575,263 | 11/1951 | Eisenhauer ......................... 152/225 |
| 3,034,555 | 5/1962 | Fischer et al. ...................... 152/218 |
| 3,753,456 | 8/1973 | Saunders ............................. 152/225 |

*Primary Examiner*—Drayton E. Hoffman
*Assistant Examiner*—Larry H. Martin

[57] ABSTRACT

An auxiliary tire traction device for use with vehicle tires to provide increased traction when dictated by road or other conditions wherein the device may be detachably secured to the tire to increase contact and driving force for the vehicle.

1 Claim, 8 Drawing Figures

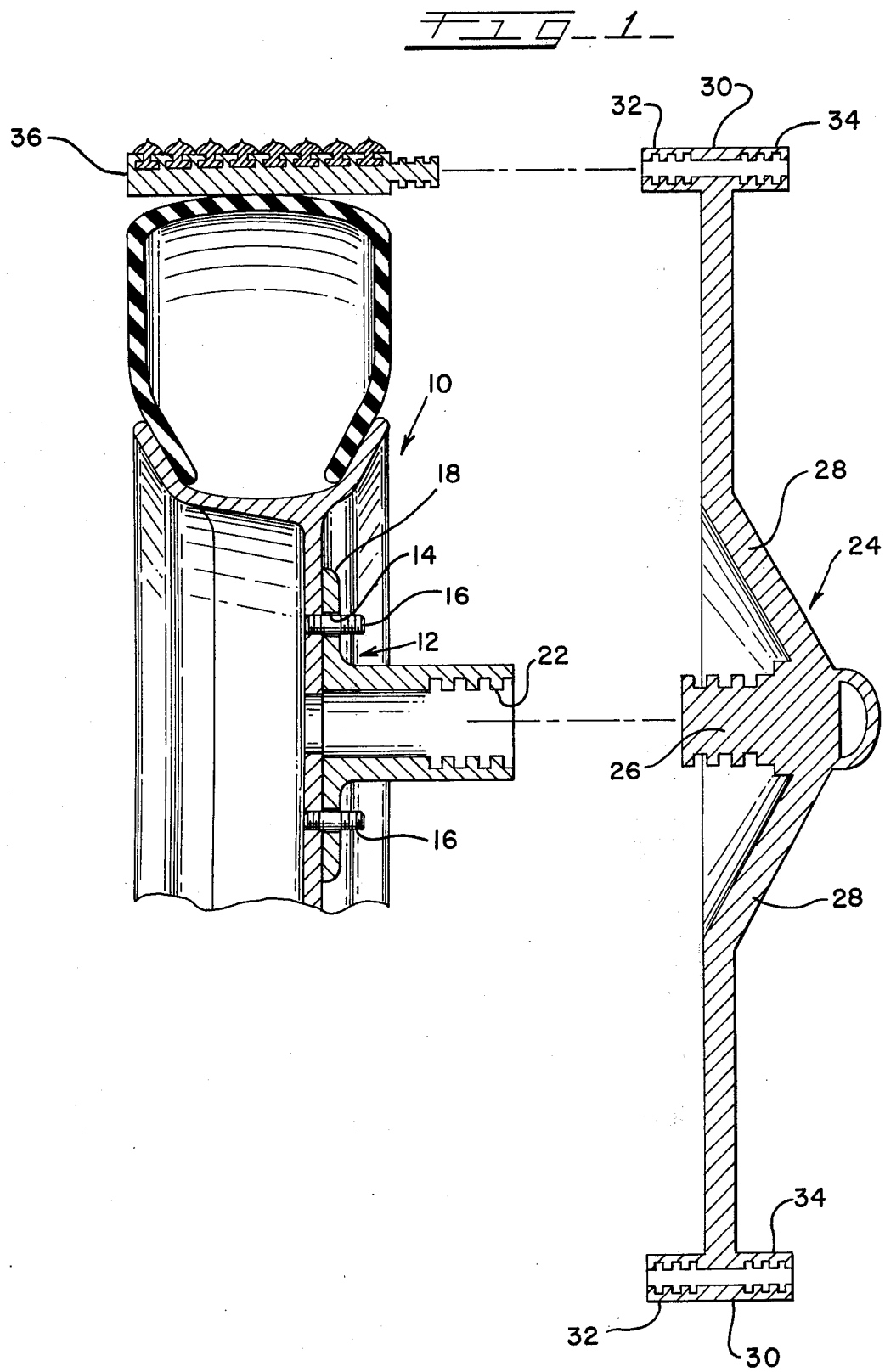

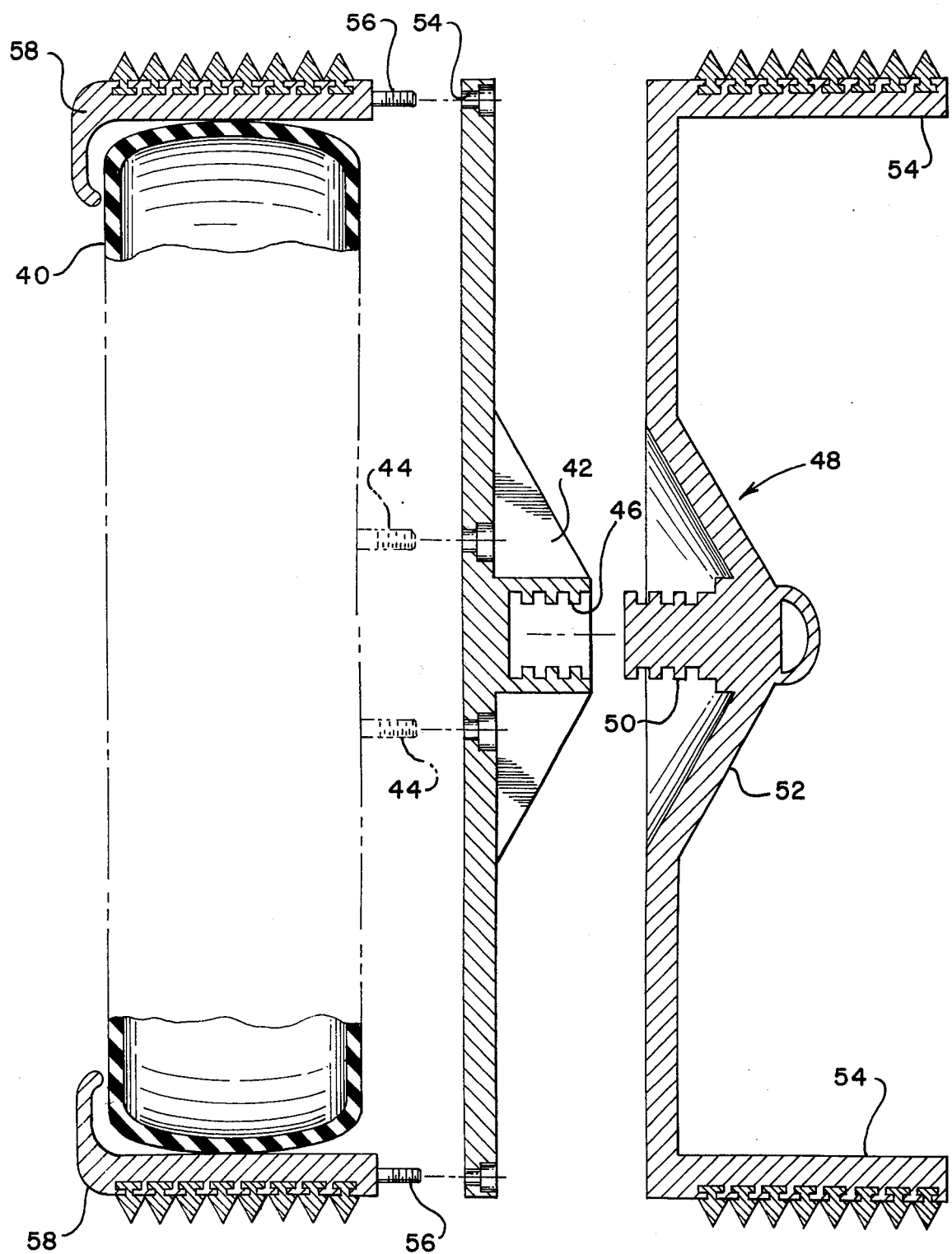

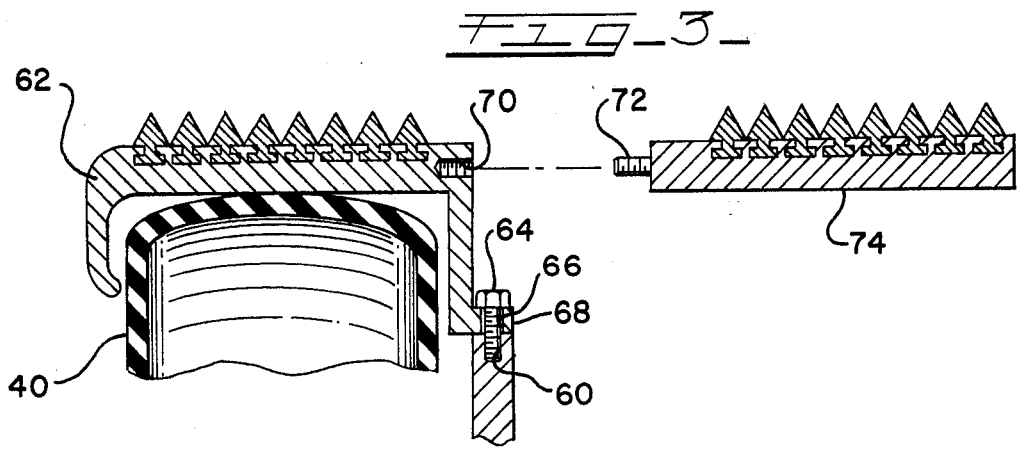
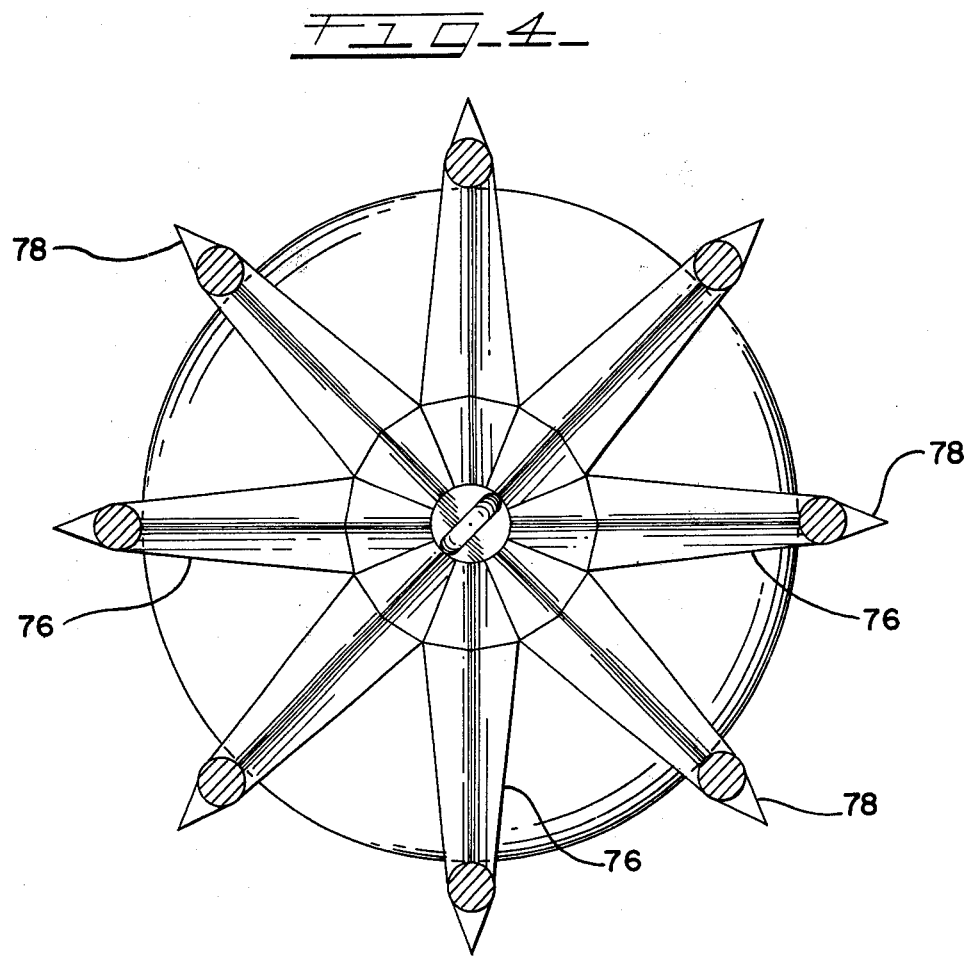

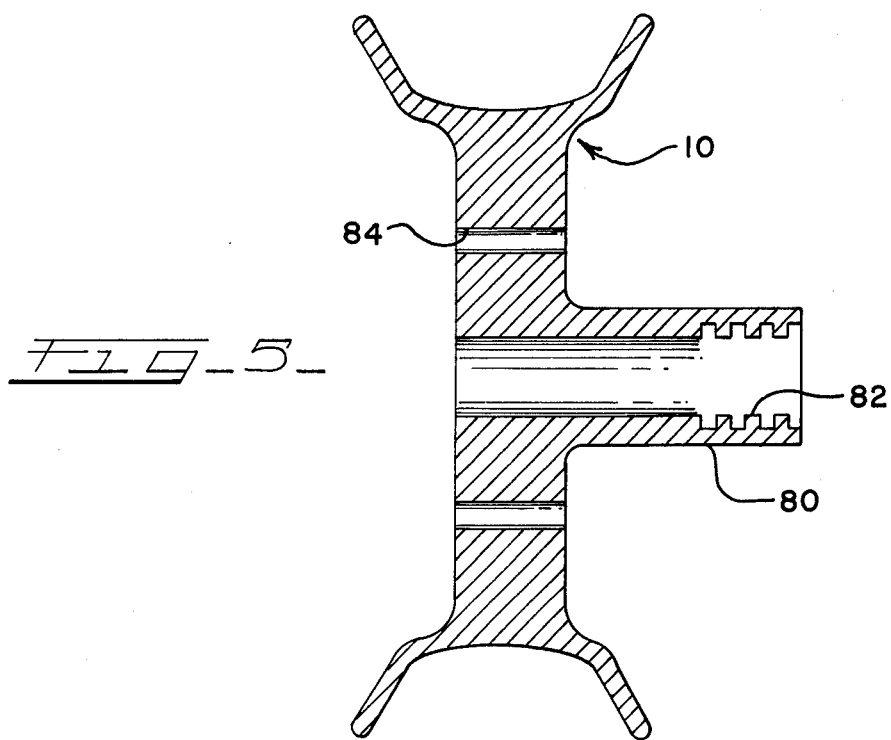
FIG_5_
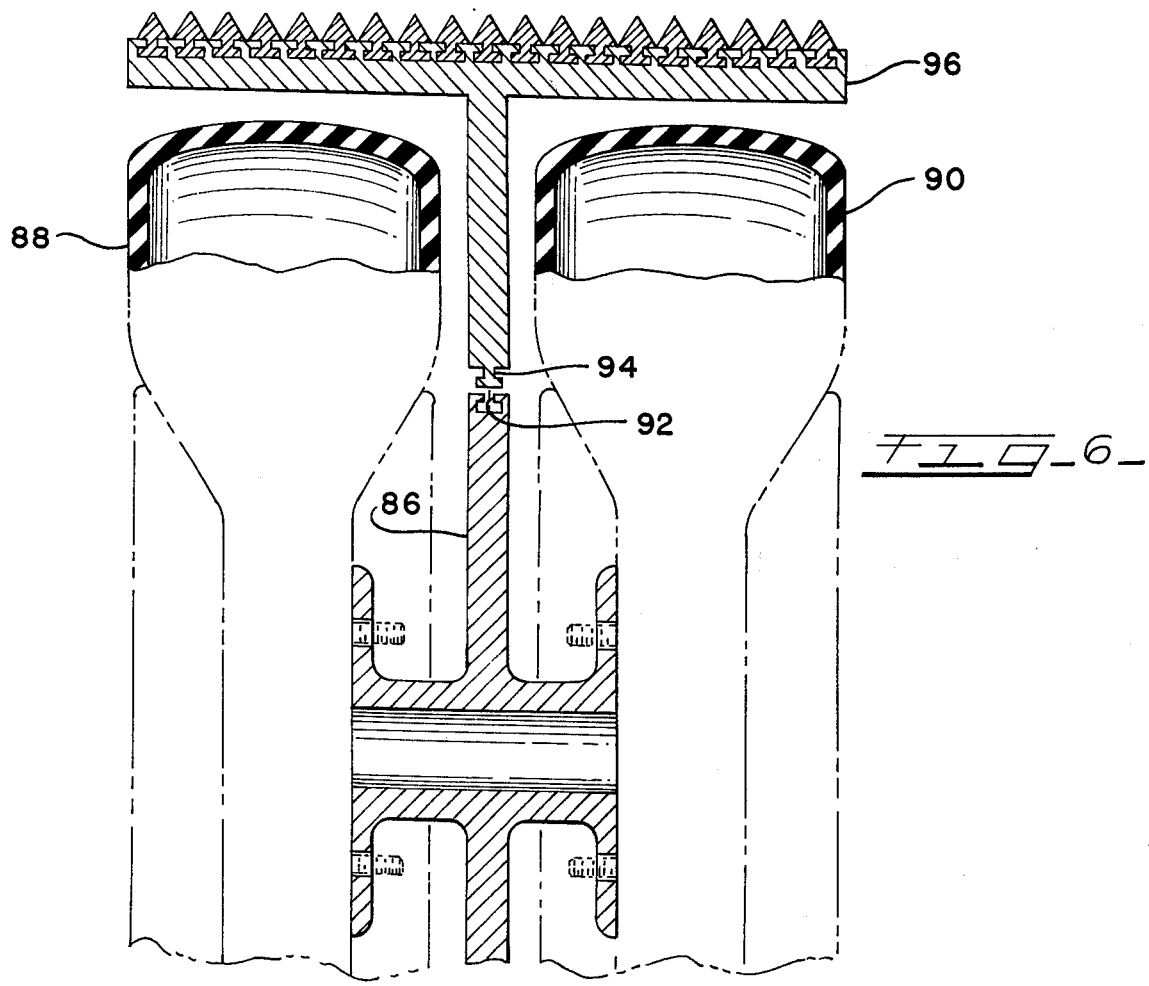
FIG_6_

FIG_7_
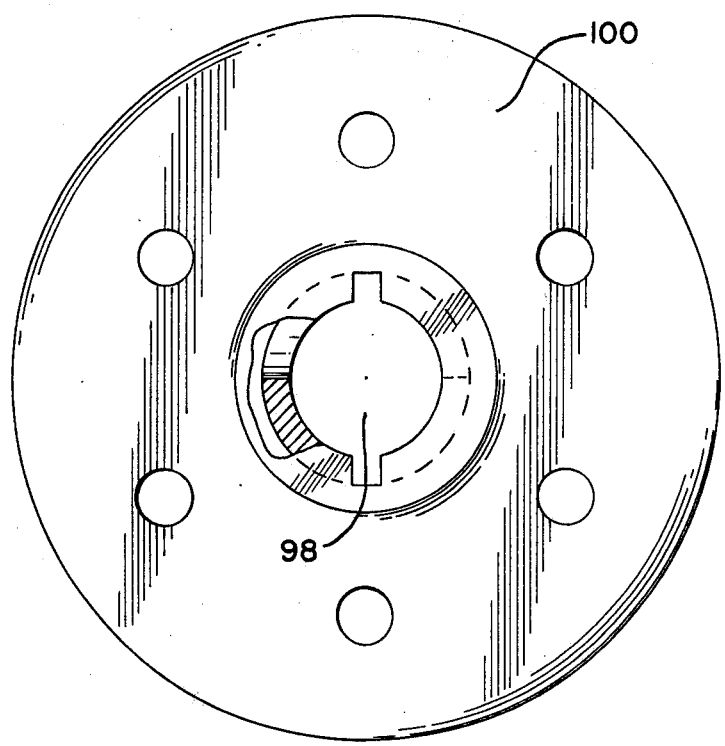
FIG_8_
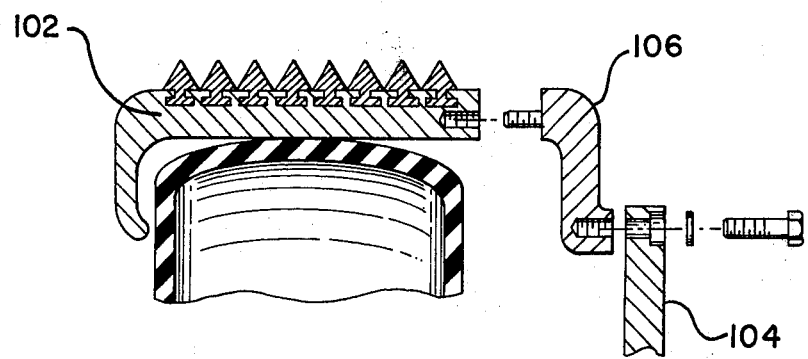

TIRE TRACTION DEVICE

The present invention relates to an improved auxiliary tire traction device for use primarily with vehicle tires as a means for providing increased traction, when necessary, to facilitate movement of the vehicle along the ground, or other surface.

Many devices of various types have been devised for use with vehicles to increase the traction or driving contact of the vehicle with the ground. Tire chains, for example, would be a common example of such a device. Other similar examples may be readily identified. Generally, the devices developed in the past have involved the use of means temporarily affixed to the outer surface of the tire by actually fitting the device over the tire (as in the case of tire chains) or by clamping the device to the tire surface in some manner.

The device disclosed and claimed herein, in the various forms set forth, involves means which may be physically, rigidly secured with respect to the wheel of the vehicle rather than the tire to provide means for increased driving contact with the ground and to avoid physical contact with the tire to minimize possible danger to the tire itself.

The tire traction device disclosed herein consists of three basic components. The first component involves a clamping device mounted about the tire of the vehicle and having a gripping surface on the outer periphery thereof. The clamping device may be secured by various means to an adaptor plate which may be secured in some fashion to the wheel of the vehicle. In one embodiment of the concept, a third component would be provided with projections mountable on the adaptor to define the desired tread design for the tire traction device.

It should be noted that the tire traction device may be used in conjunction with any vehicle to provide means for auxiliary traction for that vehicle when it is stuck in mud, snow, sand, or other conditions which otherwise limit the traction of the vehicle in normal operation.

The auxiliary tire traction device described herein offers an advantage over other devices in that it will provide increased traction for the wheels of a motor vehicle so that the vehicle may move through soft or rough terrain without becoming mired. There are many different tire tread designs available at this time including those provided with cleats for use in mud or snow. However, except for those vehicle which are specifically designed for such applications, most tires are intended for use on smooth, hard surfaced roads. In such use, the conventional tire is not provided with means to provide proper traction in a soft surface condition and, accordingly, the vehicle will be unable to move when such surface conditions exist. The concept set forth herein is available for use with such vehicles and the tires of same to adapt the tires so that they would provide increased traction to permit the vehicle to move forward without difficulty.

It is, accordingly, a primary object of the present invention to provide an improved tire traction device for use with vehicles wherein the device may be secured to the wheel of the vehicle to provide for increased traction when dictated by road condtions and wherein the device may be detachably secured to the wheel to provide increased traction, as desired.

Other and further objects of the present invention reside in the provision of an improved tire traction device for use with the wheels of vehicles to provide for increased traction, as desired, wherein the device is economical to manufacture, durable in use, easy to use and adaptable for use with substantially any vehicle wheel or tire, which is economical in use, which may be readily maintained and repaired during use of the device and which may be modified for use in conjunction with any particular configuration.

The novel features which are believed to be characteristic of the invention are set forth with particularity in the appended claims. The invention itself, however, together with further objects and advantages thereof will best be understood by reference to the following description taken in connection with the accompanying drawings, in which:

FIG. 1 is a fragmentary schematic representation of the inventive concept set forth herein in one form thereof, showing the tire traction device used in combination with a vehicle wheel;

FIG. 2 is a schematic illustration of a modified form of the concept;

FIG. 3 is a fragmentary enlarged view of still another variation of the basic concept illustrating means for securing gripping means employed with the support elements;

FIG. 4 is an illustration of a modified form of the inventive concept wherein spike-like arms are employed in the assembly to define gripping means;

FIG. 5 is a schematic illustration of still another form of the inventive concept showing means for providing a support structure in the wheel of the vehicle;

FIG. 6 is another view of a form of the concept for use in conjunction with dual wheeled vehicles, for example;

FIG. 7 is an illustrative embodiment of a modified locking means for the support structure associated with the gripping means set forth herein; and FIG. 8 is a fragmentary, enlarged view of a means for fastening gripping elements associated with the inventive concept.

The tire traction device disclosed herein may be employed in combination with any vehicle for use particularly when the vehicle is unable to move by reason of the fact that the driving wheels of the vehicle are lodged in mud, snow, sand, or some other similar unsuitable ground condition. The device disclosed herein is employed by mounting a support member on the wheels of the vehicle and then placing a clamp component over the tires to define increased traction means for the driving wheels of the vehicle. After the vehicle is removed from the mired ground condition, the traction device may be disassembled for conventional driving operation of the vehicle on stable ground.

Referring more particularly now to the drawings, one form of the inventive concept is set forth in FIG. 1 showing use of the tire traction device in combination with a vehicle wheel. The wheel 10 may be of any conventional form and may involve the metal support rim commonly associated with a vehicle. As schematically illustrated in the exploded view of FIG. 1 of the drawings, a mounting plate 12 is securely fastened to the wheel 10 by placing the openings 14 of the mounting plate 12 over the lugs 16 of the wheel 10 and subsequently fastening appropriate nuts (not shown) on the lugs 16 to rigidly secure the mounting plate 12 with respect to the wheel 10. It can readily be seen that this relatively simple mode of assembly will permit a rigid assembly to be defined between the mounting plate 12 and the wheel 10. The only factor to be taken into

3 consideration resides in the provision of mating openings 14 which are adapted to be received over the projecting lug elements of the wheel 10. Since the weight and force components transmitted to the mounting plate 12 during use are distributed over a number of lug elements, it can readily be seen that the primary dimension of the mounting plate 12 need not be great.

The mounting plate 12 is defined by a base portion 18 within which the lug receiving openings 14 are defined and a hub portion 20 extending integrally from the base 18 of the mounting plate 12.

The hub portion 20 may be generally circular in configuration and contain a threaded portion 22 along a portion of the interior wall thereof.

The support assembly 24 for the gripping means (to be described herein) is defined by a first lug-containing or threaded portion 26 in the central area thereof. The assembly portion 26, noted above, is adapted to be received within the portion 22 defined in the hub 20 to releasably secure the portion 26, and associated structure, with respect to the mounting plate 12. A radially extending arm or disc portion 28 extends outwardly from the central assembly portion 26 and terminates in the tread gripping means receiving terminal 30 of the assembly.

As schematically represented in the drawing of FIG. 1, the gripping means receiving terminal 30 is provided with opposed threaded portions 32 and 34. Gripping means 36 are adapted to be threadably received within the portions 32 and 34, as desired. As schematically represented in the drawing of FIG. 1, the gripping means 36 extend over the outer circumference of the tire 38, in one configuration and may, if desired, extend along an area spaced from the outer circumference of the tire if used to provide for distribution of gripping force over a substantially wide area to increase the traction available in driving of the vehicle through an unstable ground condition.

It can readily be seen from the fragmentary exploded view of FIG. 1 that the traction device disclosed herein is readily adaptable for use with substantially any vehicle by securing the mounting plate 12 to the lugs 16 commonly associated with the wheel 10 of a vehicle and then securing the support assembly 24 to the mounting plate 12, as desired. The gripping means 36 subsequently may be secured to the support assembly when necessary in use to provide for increased traction as will be obvious from the drawings illustrating the concept disclosed and claimed herein.

A modified form of the inventive concept generally disclosed herein is set forth in the schematic illustration of FIG. 2 of the drawings. In that drawing, as illustrated, the tire 40 is mounted on a wheel (not shown) in a conventional manner in substantially the form as schematically illustrated in FIG. 1 of the drawings. A mounting plate 42 is rigidly secured to the wheel (not shown) by attaching the plate 42 to the lugs 44 illustrated in FIG. 2 of the drawings. A fastening means may be secured over the lugs 44 to rigidly secure the mounting plate 42 with respect to the wheel (not shown) associated with the tire 40 of the vehicle.

The mounting plate 42 of the modified form of the inventive concept illustrated schematically in FIG. 2 of the drawings is provided with a center hub portion having a threaded configuration 46.

A support assembly indicated generally at 48 is adapted to be removably secured to the mounting plate 42 by threadably securing the central portion 50 of the

4 support assembly 48 withing the threaded configuration 46 of the mounting plate 42. It can readily be seen that the support assembly 48 is removably secured with respect to the mounting plate 42 by threaded insertion and removal of the portion 50 with respect to the threaded portion 56 of the mounting plate 42. The support assembly 48 is provided with radially extending arms or disc section 52 defined outwardly of the central portion integrally joined with the central threaded portion 50 of the wupport assembly 48. The radially extending arms or disc portion 52 of the support assembly 48 terminate in gripping extensions 54. In addition, an opening 54 is defined adjacent the outer periphery of the mounting plate 42 within which mounting extensions 56 of supplementary gripping elements 58 may be received to be rigidly secured with respect to the mounting plate 42 as schematically illustrated in FIG. 2. The supplementary gripping means 58 of the assembly are adapted to be received over the outer periphery of the tire 40 to provide additional means for traction for the driving wheels of the vehicle so that the vehicle may be moved from an unstable ground surface area to a stable ground surface area where the supplementary gripping elements may be removed to condition the vehicle for conventional travel over a stable ground surface.

Still another modified form of the inventive concept disclosed and claimed herein is illustrated in the fragmentary enlarged view of FIG. 3 of the drawings. In that form, the mounting plate 42 is secured to the wheel, as noted above in conjunction with specific discussion of the structure disclosed in FIGS. 1 and 2 of the drawings. The mounting plate 42 is provided with a threaded recessed portion 60, as illustrated. Supplementary gripping means 62 may be secured to the mounting plate 42 of the configuration illustrated in FIG. 3 of the drawings by fastening a threaded bolt member 64 through an opening 66 defined in a flange 68 of the gripping means 62. The bolt 64 is threadably extended into the threaded opening 60 of the mounting plate 42, as illustrated, to rigidly secure the gripping means 62 with respect to the mounting plate 42 of the assembly.

The gripping means 62 is provided, as in the other illustrative forms previously described, with serrated projections adapted to physically engage the ground surface to provide for increased traction with respect to the ground surface.

The gripping means 62 also defines an internally threaded portion 70 adapted to receive the threaded portion 72 of auxiliary gripping means 74, as illustrated, to provide for still further traction for the driving wheels of a vehicle.

The modified form of the inventive concept generally illustrated in FIG. 4 of the drawings involves a series of radially spaced apart projections 76 terminating in gripping elements 78. The spike-like arm projections 76 of the form set forth in FIG. 4 of the drawings is adapted to be secured to the wheel 10 of the vehicle in substantially the same form as schematically described and illustrated in connection with a description of the forms set forth in FIGS. 1, 2 and 3 herein. Accordingly, a detailed description of the means of attachment of the gripping means will not again be set forth in connection with a description of the embodiment set forth in FIG. 4 of the drawings. The illustrative form schematically set forth in FIG. 4 is self-descriptive and involves another form of the inventive concept for providing increased traction for use in conjunction with a vehicle.

Still another form of the inventive embodiment disclosed and claimed herein is schematically illustrated in FIG. 5 of the drawings wherein the threaded hub portion 80 generally associated with the support assembly mounting means is illustrated as being integrally associated with the wheel assembly 10 of a vehicle (not shown). The hub portion 80 is provided with an internally threaded portion 82, as illustrated, in much the same manner as that illustrated in FIGS. 1-4 of the drawings herein. Lug bolt assemblies may be provided for use in conjunction with the wheel 10 as in a conventional wheel assembly and the lug bolts may be inserted through lug bolt openings 84 as schematically illustrated in FIG. 5.

The modified form of the inventive concept set forth in FIG. 6 hereof involves utilization of the device in combination with a dual wheeled vehicle such as a truck having such an assembly associated therewith. It can readily be seen from the illustrative drawing set forth in FIG. 6 that a mounting plate assembly 86 may be permanently associated with the hub assembly of the dual wheeled structure having tires 88 and 90 in the assembly. The mounting plate assembly 86 may be provided with locking means 92 associated therewith adapted to receive mating locking means 94 associated with a gripping means 96. If the truck, or dual wheeled vehicle, becomes mired in an unstable ground condition the gripping means 96 may be inserted into the locking means 92 of the mounting plate 86, as desired, and the vehicle then will be provided with auxiliary gripping means (96) to facilitate removal of the vehicle from the unstable ground condition to a stable ground condition for continued movement of the vehicle, as desired.

Still another form of the inventive embodiment set forth herein involves an improved locking assembly for mounting the mounting plate, defined herein above, in association with the wheel 10 of a vehicle with which the auxiliary gripping means disclosed and claimed herein is to be utilized.

The modified form of the inventive concept set forth in FIG. 7 of the drawings involves the use of a cam locking surface wherein the mounting plate 98 is adapted for insertion within mating recesses and camming surfaces of the wheel 100 of the vehicle and is adapted to be secured to the wheel 100 by rotation of the mounting plate 98 with respect to the wheel 100 in a direction to frictionally engage the mounting plate 98 with respect to the wheel 100 simply by rotation of one with respect to the other to wedge the interface together.

The illustrative embodiment set forth in FIG. 8 of the drawings involves a further modification wherein the gripping means 102 associated with the inventive concept disclosed and claimed herein is adapted to be secured to the mounting plate 104 through a mounting arm 106 associated with the assembly as illustratively set forth in the drawings of FIG. 8 herein.

While a specific embodiment of the present invention has been shown and described, it will, of course, be understood that other modifications and alternative constructions may be used without departing from the true spirit and scope of the invention. It therefore is intended by the appended claims to cover all such modifications and alternative constructions as fall within their true spirit and scope.

What is claimed, is:

1. An improved tire traction device defining an auxiliary structure for use with wheeled vehicles with tires to provide for increased traction for the vehicle when it is moving over unstable ground, the improved device comprising, in combination:

a mounting plate adapted to be (removably) secured to the wheel of a vehicle, wherein the mounting plate is integrally defined with the wheel and adapted to removably receive a support assembly;

a support assembly adapted to be removably secured to the mounting plate and having means thereon to receive auxiliary gripping devices, the support assembly having a portion thereof extending radially from the mounting plate to substantially the outer periphery of the vehicle tire; and gripping means adapted to be removably secured to the support assembly and defining spaced apart auxiliary traction means to define increased gripping action for the vehicle when moving over unstable ground wherein the gripping means are threadably received within the means provided on the support assembly and wherein the gripping means are secured to the support assembly such that they extend over the outer periphery of the tires of the vehicle in spaced apart relation about the periphery to define an increased traction means for the vehicle and extention, gripping means adapted to be mounted on the support assembly such that they extend laterally outwardly of the outer periphery of the tire to define increased traction area for the device thereby spreading the driving force over a larger area.

* * * * *